US009330591B2

(12) United States Patent
Jeong et al.

(10) Patent No.: US 9,330,591 B2

(45) Date of Patent: May 3, 2016

(54) DATA DISPLAY METHOD AND DEVICE

(75) Inventors: Young-Min Jeong, Suwon-si (KR); Sung-Dae Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1093 days.

(21) Appl. No.: 12/976,007

(22) Filed: Dec. 22, 2010

(65) Prior Publication Data

US 2011/0148906 A1 Jun. 23, 2011

(30) Foreign Application Priority Data

Dec. 22, 2009 (KR) ........................ 10-2009-0128755

(51) Int. Cl.

| | |
|---|---|
| ***G06T 15/60*** | (2006.01) |
| ***G09G 5/00*** | (2006.01) |
| ***H04N 5/57*** | (2006.01) |
| ***G09G 3/20*** | (2006.01) |
| *G09G 3/32* | (2016.01) |

(52) U.S. Cl.

CPC ............ *G09G 3/2007* (2013.01); *G09G 3/3208* (2013.01); *G09G 2320/066* (2013.01); *G09G 2320/0626* (2013.01); *G09G 2320/0686* (2013.01); *G09G 2330/021* (2013.01)

(58) Field of Classification Search

CPC .............. G09G 5/10; G09G 3/32; H04N 9/64

USPC .......................... 345/531, 102, 211, 589, 690

See application file for complete search history.

(56) References Cited

U.S. PATENT DOCUMENTS

| | | | | |
|---|---|---|---|---|
| 4,710,805 | A * | 12/1987 | Markle et al. | 348/28 |
| 4,809,348 | A * | 2/1989 | Meyer et al. | 382/259 |
| 6,289,126 | B1 * | 9/2001 | Ishisaka | 382/205 |
| 7,605,536 | B2 * | 10/2009 | Kim | 313/506 |
| 2002/0030647 | A1 * | 3/2002 | Hack et al. | 345/82 |
| 2004/0169746 | A1 * | 9/2004 | Chen et al. | 348/246 |
| 2005/0052446 | A1 * | 3/2005 | Plut | 345/211 |
| 2005/0212726 | A1 | 9/2005 | Namba et al. | |
| 2005/0212825 | A1 * | 9/2005 | Lee et al. | 345/690 |
| 2006/0055657 | A1 * | 3/2006 | Koyama et al. | 345/102 |
| 2006/0120082 | A1 | 6/2006 | Choo et al. | |
| 2006/0244476 | A1 * | 11/2006 | Zhang et al. | 324/770 |
| 2008/0186322 | A1 * | 8/2008 | Polak et al. | 345/589 |
| 2009/0079678 | A1 | 3/2009 | Ozawa | |

FOREIGN PATENT DOCUMENTS

| | | |
|---|---|---|
| CN | 1776503 | 5/2006 |
| CN | 101393719 | 3/2009 |
| EP | 1 962 266 | 8/2008 |

(Continued)

*Primary Examiner* — Ke Xiao

*Assistant Examiner* — Whitney Pointe

(74) *Attorney, Agent, or Firm* — The Farrell Law Firm, P.C.

(57) ABSTRACT

A low power display and a method for display in a display device having an Active Matrix Organic Light Emitting Diodes AMOLED panel are provided. A display window that includes content to be displayed on the AMOLED panel is determined. Luminance values of pixels constituting the display window are grasped. The pixels having luminance values that are to be adjusted are determined in accordance with a distribution degree of pixels having luminance values that are larger than a reference luminance value. The luminance values of the determined pixels are changed to the reference luminance value, and the display window is displayed on the AMOLED panel with the changed luminance values.

13 Claims, 11 Drawing Sheets
(5 of 11 Drawing Sheet(s) Filed in Color)

(56) References Cited

FOREIGN PATENT DOCUMENTS

| | | |
|---|---|---|
| EP | 1 962 272 | 8/2008 |
| JP | 2006-053523 | 2/2006 |
| JP | 2008-096887 | 4/2008 |
| JP | 2009063841 | 3/2009 |
| KR | 1020060055305 | 5/2006 |

* cited by examiner

| Threshold | Original | 240 | 230 | 220 |
|---|---|---|---|---|
| Images |  |  |  |  |
| Current (mA) @3.7"AMOLED (3.7V) | 326 | 292 (10%) | 264 (20%) | 240 (26%) |

DATA DISPLAY METHOD AND DEVICE

PRIORITY

This application claims priority under 35 U.S.C. §119(a) to an application entitled "Data Display Method and Device" filed in the Korean Intellectual Property Office on Dec. 22, 2009, and assigned Serial No. 10-2009-0128755, the contents of which are incorporated herein by reference.

BACKGROUND OF THE INVENTION

1. Field of the Invention

The present invention relates generally to a data display, and more particularly, to a data display method and a device using Active Matrix Organic Light Emitting Diodes (AMOLEDs).

2. Description of the Related Art

There is currently a continuously increasing demand for flat panel displays in the market, and thus, diverse types of display devices have been developed. In particular, due to its excellent color representation and thin implementation, AMOLEDs have entered the markets of portable phones as well as portable terminals, such as Personal Digital Assistants (PDAs), MPEG Audio Layer-3 (MP3) devices, and the like.

Organic Light Emitting Diodes (OLED) is a self-luminescence display in which, if current flows to a phosphorous or phosphorescent organic thin film, electrons and holes are bonded on an organic layer to emit light. The OLED is divided into a Passive Matrix OLED (PMOLED) and an AMOLED. The PMOLED adopts a line driving type in which light emitting elements on a whole line simultaneously emit light, and the AMOLED adopts an individual driving type in which light emitting elements individually emit light.

In the AMOLED, the brightness of the emitted light differs in accordance with the amount of current, and thus, a large amount of current is consumed when the AMOLED emits light. FIG. 1 is a graph illustrating power consumption of AMOLED according to the brightness, that is, brightness value. Referring to FIG. 1, as the brightness value becomes large, larger power consumption is made. Since the AMOLED is a self-luminescence device, unlike a Liquid Crystal Display (LCD), Red-Green-Blue (RGB) values should be lowered in order to lower the power that is consumed in the AMOLED. Accordingly, in order to adjust the display brightness provided from the system, a gamma curve according to the brightness setting that is provided by an AMOLED display provider is used.

Since the current consumption is increased when the AMOLED having the above-described characteristics emits bright light, it is essential to lower the power consumption for diverse applications of the display device. This coincides with the general requirement in the display market for efficient use of power for long time use of content in a limited power environment.

However, if an image driving voltage is collectively lowered to save the consumed power of the AMOLED, the brightness of an unwanted portion of the image is reduced deteriorating picture quality. FIG. 2 illustrates an adjustment of the brightness level of a first display screen 10 according to an AMOLED gamma curve, and shows a second display screen 20 and a third display screen 30. As illustrated in FIG. 2, if the brightness of pixels is adjusted according to the AMOLED gamma curve, the brightness of the whole screen is lowered, and thus a user's visibility is not effective.

SUMMARY OF THE INVENTION

The present invention has been made to address at least the above problems and/or disadvantages and to provide at least the advantages described below. Accordingly, an aspect of the present invention provides a data display method and device that can lower power consumption in a display device using AMOLEDs.

Another aspect of the present invention provides a data display method and device that can minimize deterioration of picture quality even when the power consumption in a display device using AMOLEDs is lowered.

A further aspect of the present invention provides a data display method and device that can reduce power consumption by partially adjusting the brightness of pixels in a display device using AMOLEDs.

According to one aspect of the present invention, a low power display method is provided in a display device having an AMOLED panel. A display window is determined that includes content to be displayed on the AMOLED panel. Luminance values of respective pixels constituting the display window are grasped. The pixels having luminance values that are to be adjusted are determined in accordance with a distribution degree of pixels having the luminance values that are larger than a reference luminance value. The luminance values of the determined pixels are changed to the reference luminance value. The display window with the changed luminance values is displayed on the AMOLED panel.

According to another aspect of the present invention, a display device is provided that includes an AMOLED panel, a driving unit for driving the AMOLED, and a display unit. The display unit determines a display window having content to be displayed on the AMOLED panel, and grasps luminance values of pixels that constitute the display window. The display unit determines which of the pixels have luminance values that are to be adjusted in accordance with a degree of distribution of pixels having luminance values that are larger than a reference luminance value. The display unit also controls the driving unit to change the luminance values of the determined pixels to the reference luminance value and to display the display window with the changed luminance values on the AMOLED panel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
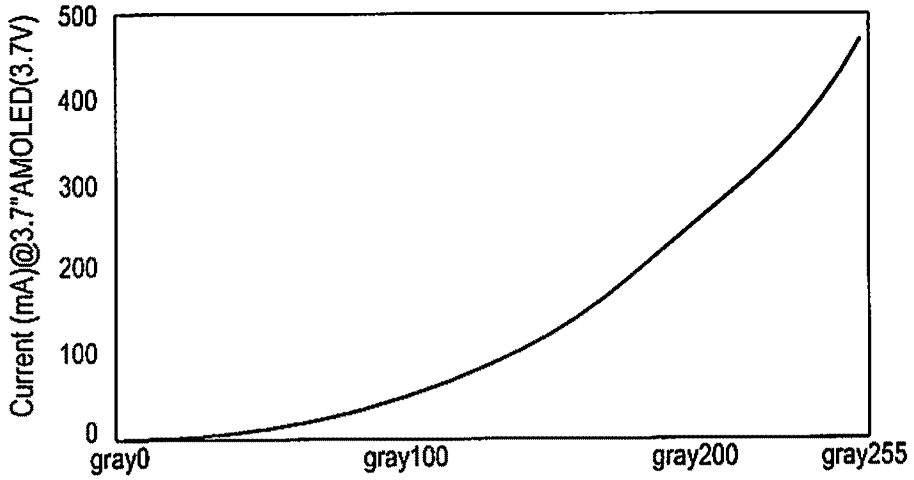
FIG. 1 is a graph illustrating power consumption of an AMOLED according to a brightness value.
Figure 2:
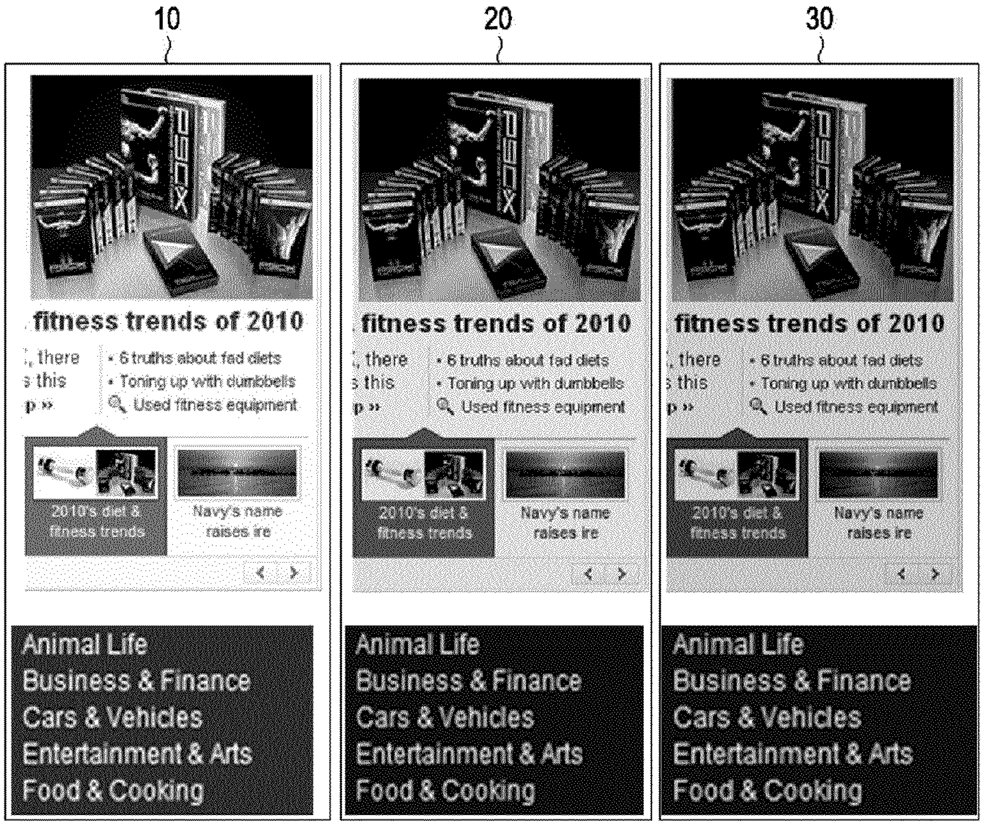
FIG. 2 is a diagram showing display screens of which the brightness of the pixels is adjusted according to an AMOLED gamma curve.

Embodiments of the present invention are described with reference to the accompanying drawings. The same or similar reference numerals may be used to designate the same or similar components although they are illustrated in different drawings. Detailed descriptions of constructions or processes known in the art may be omitted to avoid obscuring the subject matter of the present invention.

According to an embodiment of the present invention, when a display device using AMOLEDs displays data, the luminance of a white region which consumes the most power among display data is lowered to reduce the power consumption. The luminance of all pixels that correspond to the white color is not collectively lowered, but the luminance of the pixels is lowered in the case where the corresponding pixels of the white color continuously exist over a predetermined period. Thus, the picture quality of an image included in the displayed data and the visibility of information can be maintained similar to a maximum of the original.

Figure 3:
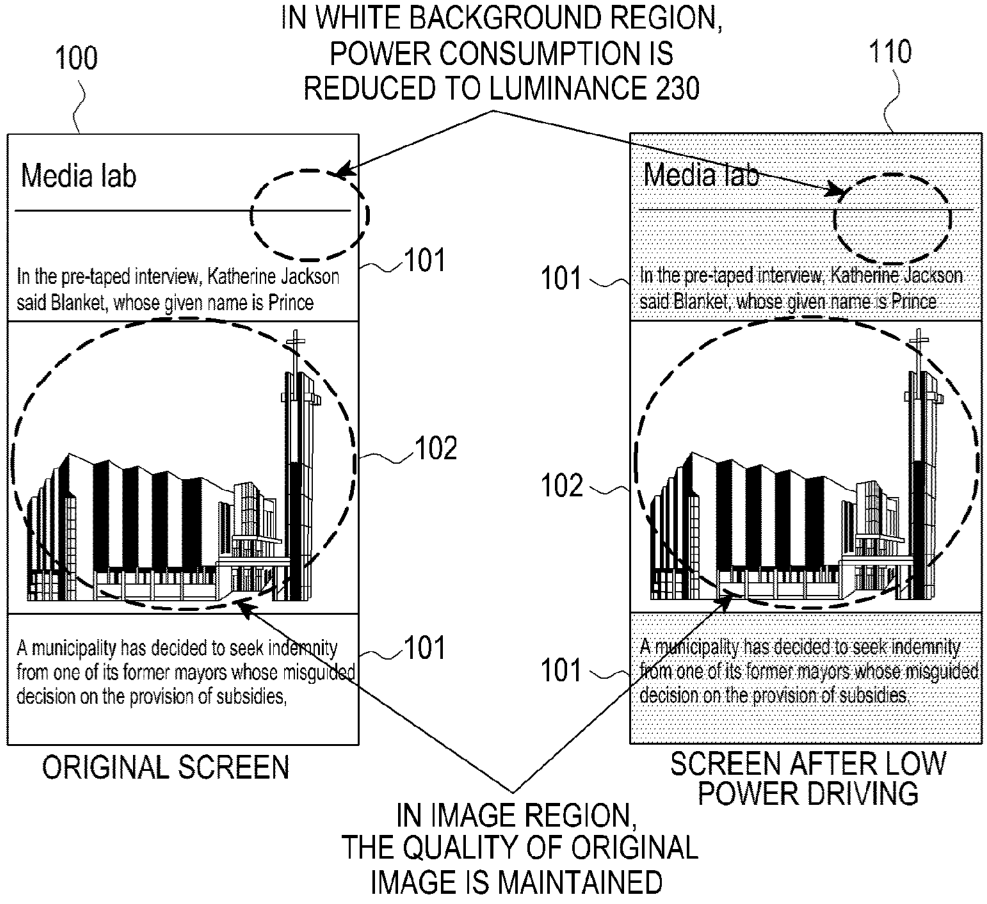
FIG. 3 is a diagram illustrating a display screen, according to an embodiment of the present invention.

For example, as shown in FIG. 3, an original 100 of the display data is divided into an upper/lower text region 101 and an intermediate image region 102, and the text region 101 is composed of black letters on a white background. By applying an embodiment of the present invention the display date becomes equal to a low power driving result 110 of FIG. 3. Specifically, according to an embodiment of the present invention, the luminance of the white background in the text region 101 is lowered to a predetermined reference value, and the luminance value of the image region 102 is maintained. By implementing the screen according to the lower power driving result 110 described above, the power consumed in the text region 101 is reduced while the picture quality of the image region 102 is preserved. Although the background of the text region 101 becomes dark, the visibility of the text information is maintained.

Figure 4:
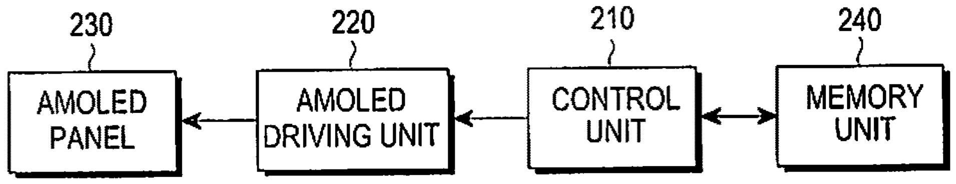
FIG. 4 is a diagram illustrating the configuration of a display device, according to an embodiment of the present invention.

The configuration of a display device to which an embodiment of the present invention is applied is illustrated in FIG. 4. Referring to FIG. 4, the display device includes a control unit 210, an AMOLED driving unit 220, an AMOLED panel 230, and a memory unit 240.

The AMOLED driving unit 220, under the control of the control unit 210, displays various kinds of data by driving the AMOLED panel 230.

The memory unit 240 stores programs for processing and control of the control unit 210, reference data, and various kinds of updatable data. The memory unit 240 also provides such data to a working memory of the control unit 210. The memory unit 240, according to an embodiment of the present invention, stores a reference luminance value. The reference luminance value is a reference value for detecting pixels, whose luminance values is to be adjusted, from among the pixels of the display data, and also a luminance value that the newly adjusted pixels have. Specifically, according to an embodiment of the present invention, the pixels having a luminance value to be changed are determined according to the distribution degree of pixels having a luminance value that is higher than the reference luminance value. The luminance value of the determined pixels is changed to the reference value.

Figure 5:
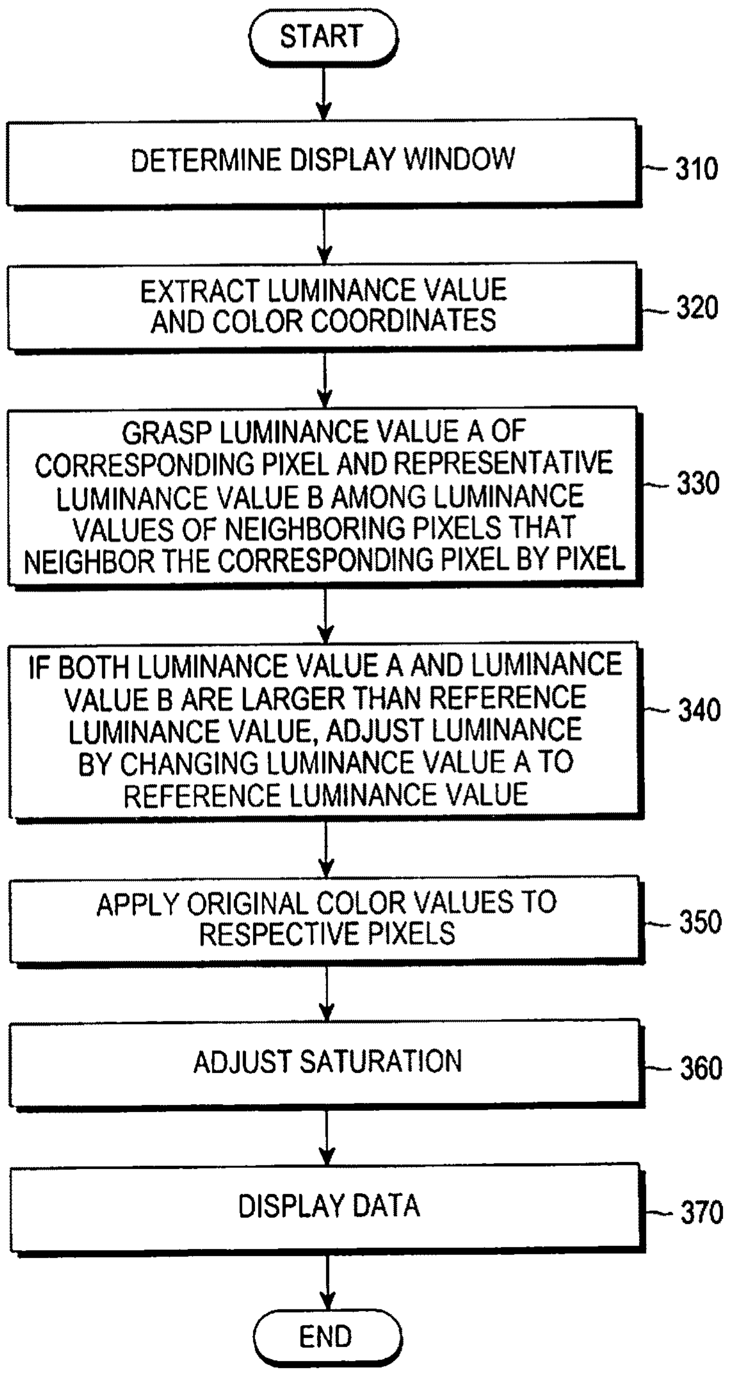
FIGS. 5 and 6 are diagrams illustrating an operation process of a display device, according to an embodiment of the present invention.
Figure 6:
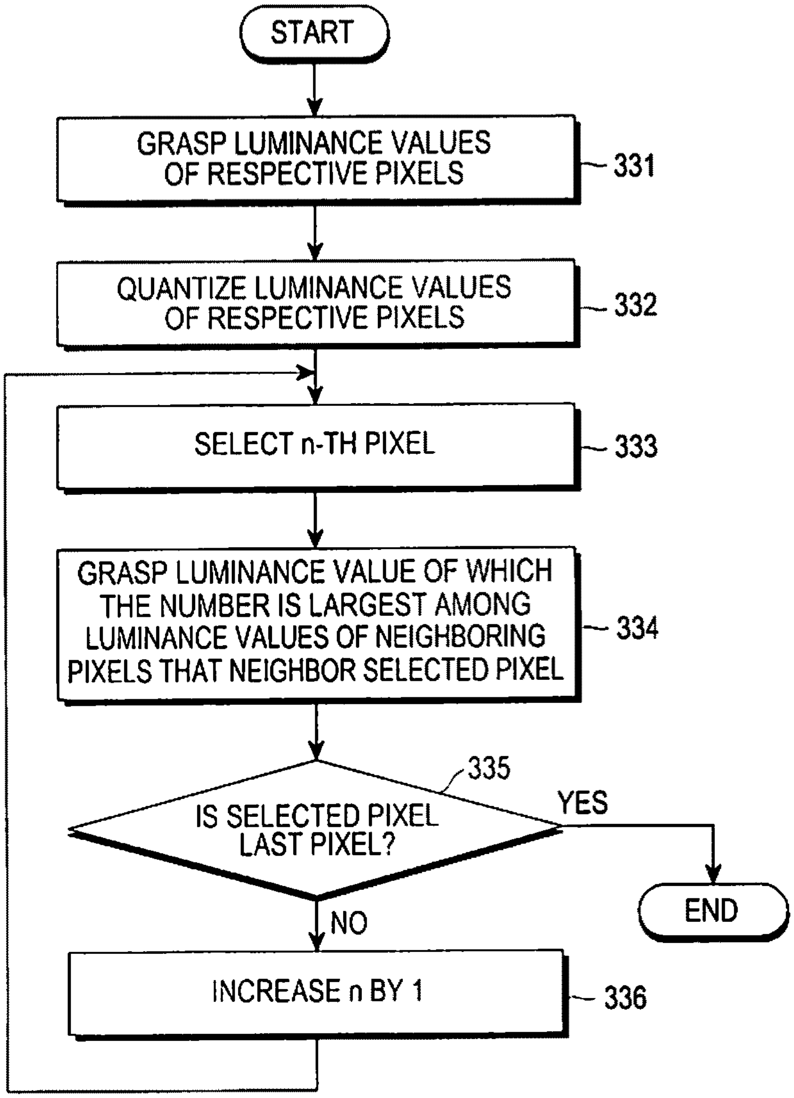
Figure 7A:
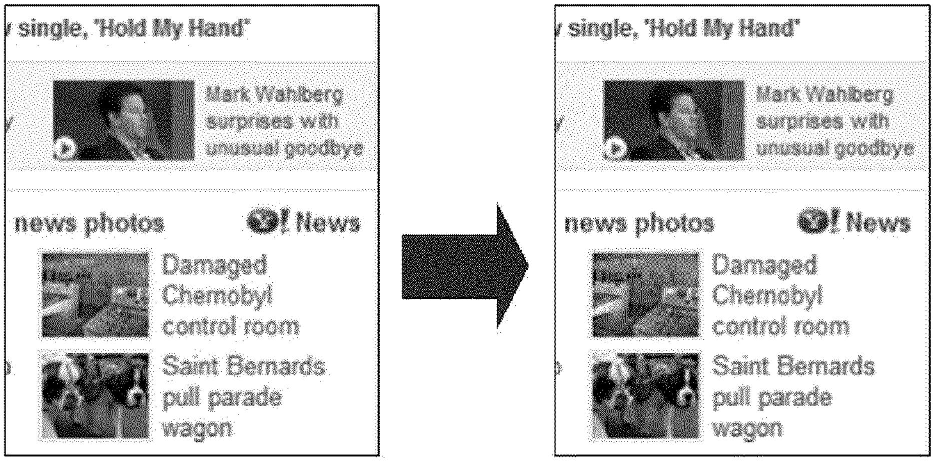
FIGS. 7A to 7E are diagrams showing a data processing procedure according to a display process, according to an embodiment of the present invention.

The operation process of the display device, according to an embodiment of the present invention, is described in detail with reference to FIGS. 5 to 8. FIGS. 5 and 6 are diagrams illustrating an operation process of a display device, according to an embodiment of the present invention. FIGS. 7A to 7E are diagrams showing a data processing procedure according to a display process, according to an embodiment of the present invention. FIG. 8 is a diagram illustrating a luminance value filtering process, according to an embodiment of the present invention.

Referring to FIG. 5, the control unit 210 constructs a display window for the content to be displayed in step 310. The display window may include various kinds of images or text that express the content, and may be an RGB type. Also, the content may be data received from the outside or data stored in the memory 240. The display window, for example, may be a web page, a short message, an address book, etc. In an embodiment of the present invention, an Internet web page in which text and an image are mixed is shown in FIG. 7.

If the display window that corresponds to the content to be displayed is determined, the control unit 210 proceeds to step 320, and extracts luminance values of the respective pixels that constitute the display window. If the display window is RGB type data, the color coordinates of the respective pixels are also extracted.

If the display window is an RGB type, in order extract the luminance values of the respective pixels and the color coordinates, the coordinate system of the display window is changed from an RGB coordinate system to a YCbCr coordinate system. FIG. 7A shows a web page screen when the coordinate system of the data is changed from the RGB coordinate system to the YCbCr coordinate system. Also, the luminance values of the respective pixels and the color coordinates are extracted. If the display window is a gray scale, only the luminance values of the respective pixels can be extracted without any separate conversion process.

The control unit 210 performs filtering that can separate the luminance value adjustment region in order to protect the luminance of a corresponding portion when effective information having high luminance value is displayed on the image portion or the background having a low luminance value. Accordingly, the control unit 210 performs the filtering in step 330 by grasping the luminance value a of a corresponding pixel and a representative luminance value b from among luminance values of neighboring pixels that neighbor the corresponding pixel. It is preferable that the representative luminance value b is determined as a luminance value that exists most frequently among the luminance values of the neighboring pixels. If all the luminance values of the neighboring pixels are different from one another, the lowest luminance value is determined as the representative value. If there are a plurality of luminance values having the same existence frequency, or prevalence, although their luminance values are different, the lowest luminance value among them is determined as the representative luminance value.

In an embodiment of the present invention, the above-described filtering is called a max bin filtering. The max bin filtering may be performed by the control unit 210, or may be performed through a separate filter.

The max bin filtering process is described with reference to FIGS. 6 to 8. Referring to FIG. 6, the control unit 210 grasps the luminance values of the respective pixels in step 331. In step 332, the control unit 210 quantizes the luminance values of the respective pixels in order to minimize the information amount of the luminance values. In step 333, the control unit 210 selects the n-th pixel. Also, in order to grasp the degree of luminance value distribution in the neighborhood of the selected n-th pixel, the control unit 210 determines a window that includes neighboring pixels of the selected n-th pixel. In an embodiment of FIG. 8, a 3×3 window is shown in 410. 420 presents values obtained by quantizing the respective pixels included in the 3×3 window of 410 by 16 levels.

Referring again to FIG. 6, the control unit 210 grasps the luminance value having the largest existence frequency among the luminance values of the neighboring pixels in step 334. For example, as shown in 430 of FIG. 8, the pixel value having the highest existence frequency, is determined as the Maxbin1 value, and the frequency of the pixel value that corresponds to the Maxbin1 is determined as the Maxcnt1 value. Accordingly, Maxbin1 in the first column becomes 192, and Maxcnt1 becomes 2. In the same manner, in 440 and 450, the Maxbin n value and Maxcnt n value are determined in the second column and in the third column. Accordingly, Maxbin2 becomes 64, Maxcnt2 becomes 2, Maxbin3 becomes 224, and Maxcnt3 becomes 3. Then, by grasping Maxbin n having the highest Maxcnt n value through comparison of the Maxcnt n value, the representative n value is derived. In FIG. 8, 224 becomes the representative luminance value b. These processes are repeatedly performed from the first pixel to the last pixel in the display window in step 335 and step 336.

Figure 7B:
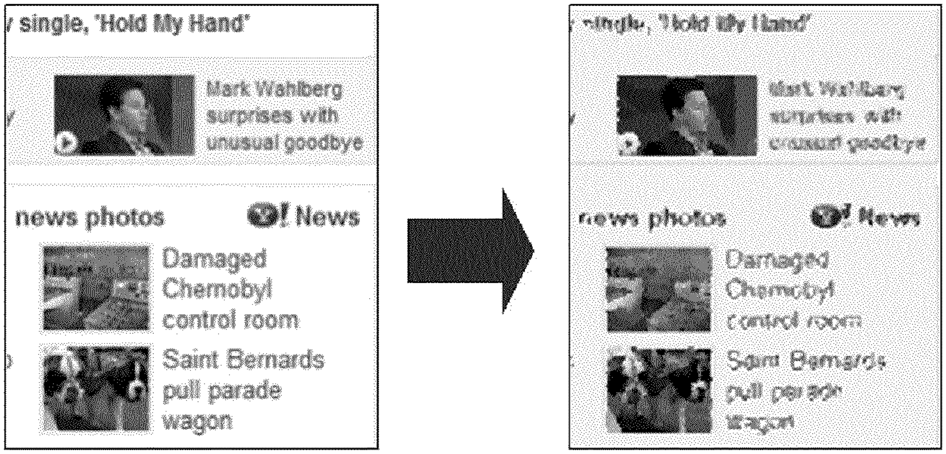
Figure 8:
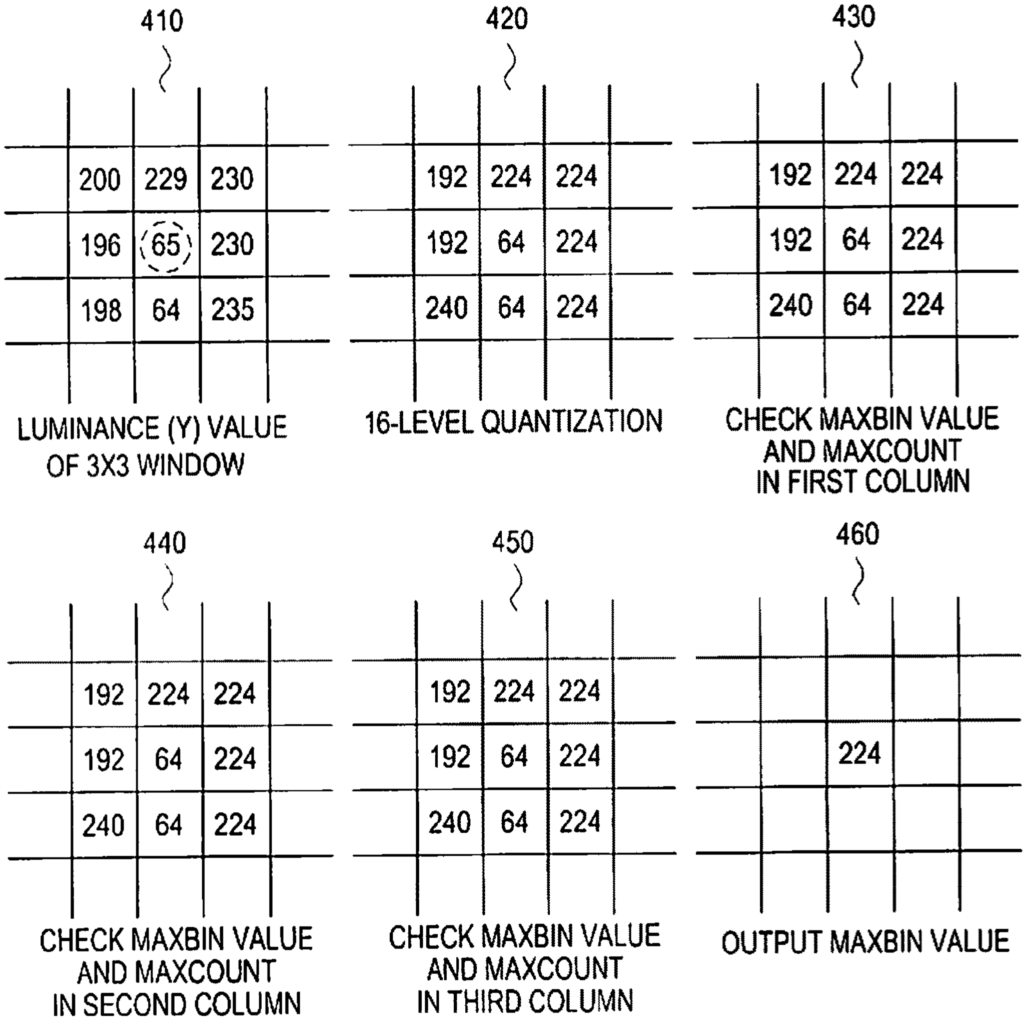
FIG. 8 is a diagram illustrating a luminance value filtering process, according to an embodiment of the present invention.

In accordance with the representative luminance values determined through the Max bin filtering process, the web page, which has been converted into the YCbCr coordinate system of FIG. 7A, is displayed as shown in FIG. 7B.

Figure 7C:
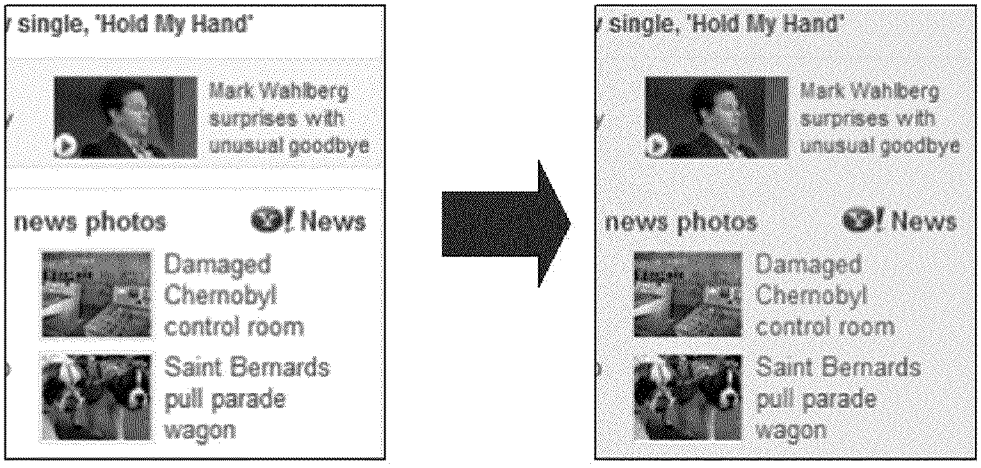

Referring back to FIG. 5, the control unit 210 compares the luminance value a and the representative luminance value b with the reference luminance value in step 340 after detecting the representative luminance value related to the respective pixels. If both luminance values are larger than the reference luminance value, the control unit changes the luminance value a to the reference luminance value to control the luminance. At this time, even if any one of the luminance value a and the representative luminance value b is below the reference luminance value, the luminance value of the corresponding pixel is maintained as it is. Thus, the luminance value of the image region can be protected. FIG. 7C shows the web page as a result of adjusting the luminance values in steps 330 and 340 with respect to the web page which has been converted into the YCbCr coordinate system. Referring to FIG. 7C, although the white background of the region in which the text is included becomes dark, the visibility of the information can be secured, and the quality of the image is maintained.

Figure 7D:
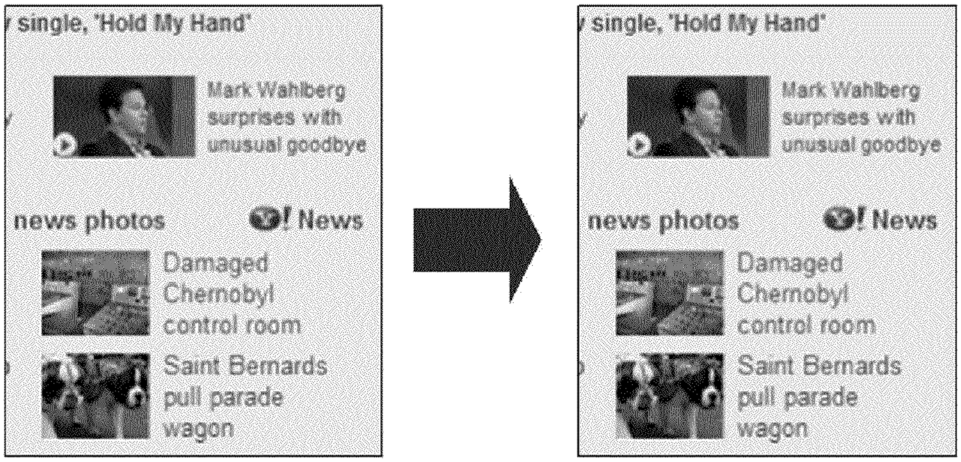
Figure 7E:
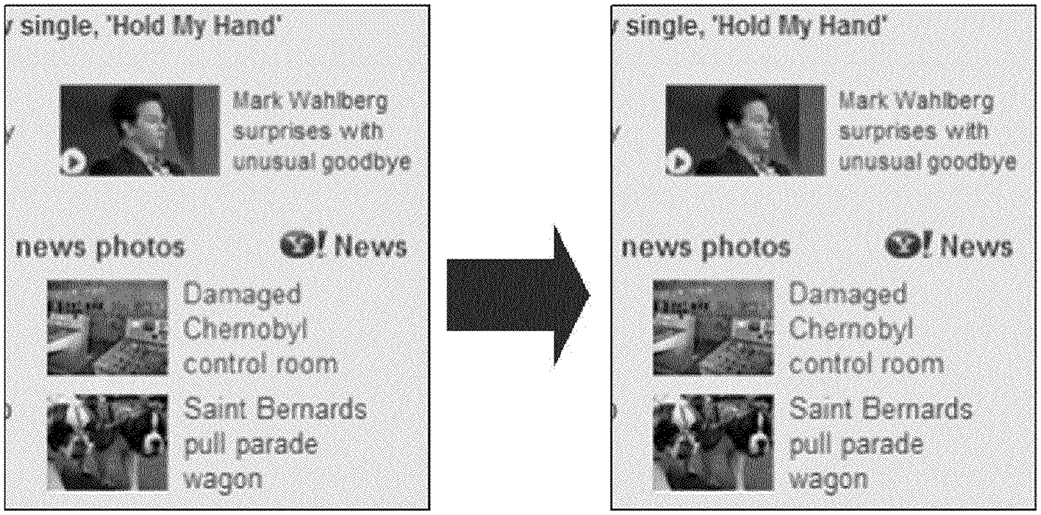

The control unit 210 applies the color coordinates of the original to the respective pixels in step 350. Accordingly, the luminance value adjustment web page of FIG. 7C may be changed as shown in FIG. 7D. However, in accordance with the luminance value adjustment, the saturation of the image color value may seem to be lowered due to the surrounding lowered luminance value. In order to supplement this, the control unit 210 adjusts the saturation value for the purpose of improving the sharpness in step 360, and finally displays the data in step 370 of FIG. 5. In order to improve the saturation of the display window, for example, a matrix calculation method as shown in Equation (1) may be used. An example of the screen in which the saturation value has been adjusted is illustrated in FIG. 7E.

$$\begin{bmatrix} R_{(N)} \\ G_{(N)} \\ B_{(N)} \end{bmatrix} = \begin{bmatrix} 0.299+0.701k & 0.299(1-k) & 0.299(1-k) \\ 0.587(1-k) & 0.587+0.413k & 0.587(1-k) \\ 0.114(1-k) & 0.114(1-k) & 0.114+0.885k \end{bmatrix} \begin{bmatrix} R_{(k)} \\ G_{(k)} \\ B_{(k)} \end{bmatrix} \quad (1)$$

By adjusting the luminance value of the display window through the above-described process, the power consumption can be reduced, the picture quality deterioration is minimized, and the visibility of information can be maintained, as the power consumption during the data display is lowered.

Figure 9:
FIG. 9 is a diagram showing effects obtained according to an application of an embodiment of the present invention.
Figure 9:
Figure 9:
Figure 9:

FIG. 9 is a diagram illustrating the result of measuring to what degree current is consumed on the actual AMOLED display after the low power driving of the AMOLED is applied, according to an embodiment of the present invention. In accordance with the intensities of 240, 230, and 220, current consumption reduction ratios of 10%, 20%, and 26% are shown. Thus, according to an embodiment of the present invention, the display power consumption can be lowered as the image quality of the display window is maintained.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A low power display method in a display device having an Active Matrix Organic Light Emitting Diodes (AMOLED) panel, the method comprising the steps of:

determining a display window including content to be displayed on the AMOLED panel;

determining a luminance value of each pixel included in the display window;

determining a representative luminance value of each pixel included in the display window from among luminance values of respective neighboring pixels;

comparing both the luminance value of each pixel included in the display window and the representative luminance value of each pixel included in the display window with a reference luminance value;

when both a luminance value of at least one pixel included in the display window and a representative luminance value corresponding to the at least one pixel are larger than the reference luminance value, identifying the at least one pixel as a pixel having a luminance value to be adjusted;

adjusting the luminance value of the identified at least one pixel to the reference luminance value; and displaying the display window with the identified at least one pixel having the adjusted luminance value.

2. The low power display method as claimed in claim 1, wherein a luminance value that is most prevalent among the luminance values of the respective neighboring pixels is determined as the representative luminance value.

3. The low power display method as claimed in claim 2, wherein, when all of the luminance values of the respective neighboring pixels differ from one another, a smallest luminance value of the respective neighboring pixels is determined as the representative luminance value.

4. The low power display method as claimed in claim 3, wherein, when there are a plurality of luminance values having a same prevalence among the luminance values of the respective neighboring pixels, a smallest luminance value from among the plurality luminance values is determined as the representative luminance value.

5. The low power display method as claimed in claim 1, further comprising maintaining the luminance value of the at least one pixel included in the display window, when at least one of the luminance value of the at least one pixel and the representative luminance value corresponding to the least one pixel is below the reference luminance value.

6. The low power display method as claimed in claim 1, further comprising adjusting a saturation of the pixels included in the display window, after the luminance value of the identified at least one pixel is adjusted to the reference luminance value.

7. A display device comprising:

an Active Matrix Organic Light Emitting Diodes (AMOLED) panel; and a control unit configured to determine a display window including content to be displayed on the AMOLED panel, to determine a luminance value of each pixel included in the display window, to determine a representative luminance value of each pixel included in the display window from among luminance values of respective neighboring pixels, to compare both the luminance value of each pixel included in the display window and the representative luminance value of each pixel included in the display window with a reference luminance value, when both the luminance value of at least one pixel included in the display window and a representative luminance value corresponding to the at least one pixel are larger than the reference luminance value, to identify the at least one pixel as a pixel having a luminance value that is to be adjusted, and to adjust the luminance value of the identified at least one pixel to the reference luminance value, and to display the display widow with the identified at least one pixel having the adjusted luminance value on the AMOLED panel.

8. The display device as claimed in claim 7, wherein a luminance value that is most prevalent among the luminance values of the respective neighboring pixels is determined as the representative luminance value.

9. The display device as claimed in claim 8, wherein, when all the luminance values of the respective neighboring pixels differ from one another, a smallest luminance value of the respective neighboring pixels is determined as the representative luminance value.

10. The display device as claimed in claim 9, wherein, when there are a plurality of luminance values having a same prevalence among the luminance values of the respective neighboring pixels, a smallest luminance value from among the plurality of luminance values is determined as the representative luminance value.

11. The display device as claimed in claim 7, wherein the control unit is configured to maintain the luminance value of the at least one pixel included in the display window, when at least one of the luminance value of the at least one pixel and the representative luminance value corresponding to the at least one pixel is below the reference luminance value.

12. The display device as claimed in claim 7, wherein the control unit is configured to adjust a saturation of the pixels included in the display window after the luminance value of the at least one pixel is adjusted to the reference luminance value.

13. The display device as claimed in claim 7, wherein the respective neighboring pixels are eight pixels that surround each pixel included in the display window.

* * * * *